US006222800B1

(12) United States Patent
Miller et al.

(10) Patent No.: US 6,222,800 B1
(45) Date of Patent: Apr. 24, 2001

(54) AUTOLOAD DISK COPIER SYSTEM

(75) Inventors: David B. Miller, Orinda; Alexander V. Drynkin, Walnut Creek; William M. Hess, San Francisco, all of CA (US)

(73) Assignee: Copy Pro, Inc., Concord, CA (US)

( * ) Notice: Subject to any disclaimer, the term of this patent is extended or adjusted under 35 U.S.C. 154(b) by 0 days.

(21) Appl. No.: 08/969,633

(22) Filed: Nov. 13, 1997

Related U.S. Application Data

(63) Continuation-in-part of application No. 08/867,709, filed on Jun. 2, 1997, now abandoned.

(51) Int. Cl.$^7$ .................................................. G11B 17/22
(52) U.S. Cl. .............................................................. 369/36
(58) Field of Search .................................. 369/37, 36, 34, 369/38, 84, 30; 364/478.06, 478.03

(56) References Cited

U.S. PATENT DOCUMENTS

| | | | |
|---|---|---|---|
| 3,176,992 | * 4/1965 | Lipski | 369/178 |
| 3,976,301 | * 8/1976 | Corbett et al. | 274/10 D |
| 4,340,952 | 7/1982 | Kedo | 369/77 |
| 4,685,001 | 8/1987 | Martin | 358/342 |
| 4,766,581 | 8/1988 | Korn et al. | 369/30 |
| 4,811,325 | 3/1989 | Sharples, Jr. et al. | 369/85 |
| 4,972,398 | 11/1990 | Wachi | 369/44.25 |
| 4,995,027 | 2/1991 | Aoyagi et al. | 369/77.1 |
| 5,025,431 | * 6/1991 | Naito | 369/36 |
| 5,033,038 | 7/1991 | Kobayashi et al. | 369/36 |
| 5,036,503 | 7/1991 | Tomita | 369/36 |
| 5,040,159 | 8/1991 | Oliver et al. | 369/34 |
| 5,056,730 | 10/1991 | Fitzgerald et al. | 369/36 |
| 5,058,095 | 10/1991 | Kawakami et al. | 369/77.1 |
| 5,099,465 | 3/1992 | Geiger et al. | 369/36 |
| 5,101,388 | 3/1992 | Fushimi | 369/36 |
| 5,121,379 | 6/1992 | Funabashi et al. | 369/270 |
| 5,173,889 | 12/1992 | Nagahisa et al. | 369/37 |
| 5,212,679 | 5/1993 | Tohkairin | 369/75.2 |
| 5,291,465 | 3/1994 | Dennis | 369/37 |
| 5,297,263 | 3/1994 | Suzuki | 369/77.1 |
| 5,317,337 | 5/1994 | Ewaldt | 346/1.1 |
| 5,423,619 | 6/1995 | Kohno | 400/325 |
| 5,473,589 | 12/1995 | Horie | 369/59 |
| 5,481,514 | 1/1996 | Yamasaki et al. . | |
| 5,518,325 | 5/1996 | Kahle | 400/70 |
| 5,586,094 | * 12/1996 | Pines et al. | 369/36 |
| 5,610,893 | 3/1997 | Soga et al. | 369/84 |
| 5,841,744 | * 11/1998 | Menke et al. | 369/36 |
| 5,854,776 | * 12/1998 | Sakiyama | 369/36 |
| 5,873,692 | 2/1999 | Costas . | |
| 5,914,918 | 6/1999 | Lee et al. . | |
| 5,946,216 | 8/1999 | Hollerich . | |

OTHER PUBLICATIONS

Point Computer GMBH, Nov. 1997 Catalog.
MediaFORM, advertisement circa 1997.

* cited by examiner

Primary Examiner—Brian E. Miller
Assistant Examiner—Tod Kupstas
(74) Attorney, Agent, or Firm—Richard Esty Peterson (57) ABSTRACT

An autoload disk copier system and disk printer transport system for recordable disks, the copier system having a copier unit with a housing containing a disk drive with an extendable disk tray, a disk carrier for supporting a stack of disks over the tray, a disk separator mechanism for selectively separating a disk from the stack displacing it to a tray, a disk retrieve mechanism for retrieving a disk from the tray and depositing it in a collector for good and bad disks, and, an electronic control means for controlling the sequence of operations of loading, disk read/write, unloading and depositing disks during the automatic process of recording data on recordable disks. The disk printer transport system combines a disk retrieve mechanism and electronic control means similar to that used in the autoload disk copier system with a retractable platform, a second disk retrieve mechanism, and a disk printer, the first disk retrieve mechanism for retrieving the disk after the completion of the copy operation and depositing the disk on the retractable platform for transport to the second disk retrieve mechanism, the second disk retrieve mechanism transporting the disk from the retractable platform to the disk printer for printing.

32 Claims, 8 Drawing Sheets

AUTOLOAD DISK COPIER SYSTEM

This application is a continuation-in-part of application Ser. No. 08/867,709, filed Jun. 2, 1997, now abandoned.

BACKGROUND OF THE INVENTION

This invention relates to a recording device for storage media and a transport device for labeling storage media. In particular the recording device is a batch loaded compact disk copying unit that automatically loads and records a series of recordable disks, and the transport device is a transport unit that transports a disk from a compact disk copying unit to a printer that places a label on the top face of compact disk.

As computers and consumer electronic products have evolved to handle greater capacities of data, the storage medium for recording data or information generated has similarly evolved. The optical disk has become an inexpensive medium on which to record a large volume of data. Originally used in the audio recording industry, the laser disk or modern compact disk has become the medium choice for fixed data storage. While read/write compact disks have been devised, the large majority of compact disks are written once for multiple reading.

In the past, the transfer of data onto compact digital disks was a costly procedure economically feasible only when manufacturing a large quantity of copies. Users with applications that require relatively few copies or require frequent data updates could not reap the benefits of this technology, even though low cost disk readers were readily available. The advent of recordable digital compact disks was intended to allow users to record their own disks and thereby achieve significant savings. Unlike a common compact disk that has been pressed by a mold, a recordable disk has a surface that is etched by a laser contained in the disk recorder. Once etched, the recordable disk is unalterable and is readable indefinitely.

Commercially available disk recorders have enabled users to record individual compact disks. The disk recorder is typically connected to a personal computer having a hard drive on which the information to be transferred is temporarily stored. Ordinary programs permit the copying and transfer of data from the internal hard drive of the computer to the disk recorder, which records the data on the disk. This process is time consuming and requires the attention of a user who must load and unload the recorder after each copying transaction. Where it is desirable to record the same information on multiple disks, the use of an automatic loading device is required to eliminate the constant attention of an operator.

Various systems have been proposed by one of the present inventors and are the subject of separate applications. In application Ser. No. 08/732,940, filed Oct. 17, 1996, entitled, "Programmable Self-operating Caddy-loaded Compact Disk Duplication System," a device is described for automatically recording on a stack of compact disks contained in protective caddies. Also, in Ser. No. 60/040,422, filed Mar. 13, 1997, entitled "Programmable Self-Operating Compact Disk Duplication System Using Stacked Spindles," there is described an automatic compact disk duplication system with vertically stacked storage spindles and disk drives.

Where high volume is not a concern, batch loading for a single recorder unit can be accomplished with an automatic loading device. In this manner a series of recordable disks can be recorded without the attention of an operator. This invention relates to the electromechanical means for enhancing a standard commercial recording device with an automatic loading mechanism to enable the copying of a stack of recordable disks.

The automatic compact disk duplication systems described in the applications listed above along with other disk duplication systems currently available significantly lessen the amount of operator supervision during the disk copying process, but none of these disk duplication systems can coordinate the printing of labels or other identifying information onto the top face of each recordable disk immediately before or after the recording process. The automatic placement of a label on the face of a recordable disk eliminates the possibility that a user will mis-identify a recorded disk. The invention of the disk printer transport system relates to the electromechanical means for enhancing most commercial recording devices with a disk labeling feature, allowing users to further automate the disk duplication process while utilizing their current disk duplication equipment, thereby achieving significant cost savings for a relatively small investment.

SUMMARY OF THE INVENTION

The autoload disk copier system of this invention is designed for those operations were a modest number of compact disks are to be recorded. Although the disk copier system is primarily designed for copying recordable data disks, the system can be used for recording compact disks for audio formats and other recordable erasable media. The disk copier system has an autoload copier unit that includes one or more conventional compact disk drive units. The units may be either stacked one on top of another or oriented on the similar plane at right angles. In this manner, two or three additional drive units may be incorporated into the copier unit with minor modification to the housing and mechanical mechanisms described in the specification.

The disk copier system includes a personal computer or controller board that may be incorporated within the housing of the autoload copier unit or maintained separate therefrom. The computer provides the operating program for controlling the disk drive and the various mechanical components utilized to load and unload disks from the disk drive.

The disk drive is a conventional drive having an extendable tray for receipt and removal of a compact disk. The autoload copier unit has a batch loading device that enables a stack of blank disks to be loaded into the copier unit for automatic copying. The batch loading device positions a stack of disks with respect to an autoload separator mechanism which selectively separates and deposits a single disk from the stack onto the disk tray of the drive. The tray is then retracted and the disk drive performs either a read or write operation on the disk. When complete, the tray is extended and an autoretrieve mechanism unloads the disk from the tray, and in the preferred embodiment, deposits the disk onto one of two spindles for good or bad disks, respectively. Alternately, the disk can simply be deposited on a slide for transport to a receiving station.

In the preferred embodiment, disks are supplied to the copier unit on a carrier having a center post with an offset foot. The autoload separator mechanism has a push device to push the lower-most disk from the foot of the post and onto a disk tray arranged below the carrier.

In the preferred embodiment, the autoretrieve mechanism has a shuttle device with a carriage having a pick-up head that moves over a disk that is in the disk tray and retrieves the disk by a pick-up device that engages the disk through the center hole of the disk. The autoretrieve mechanism is displaceable on command of the computer to a desired position.

It is to be understood that with the autoload separator mechanism and autoretrieve mechanism, the autoload copier unit can include a printer for automatic printing of the disk surface utilizing the load mechanism and the retrieve mechanism described. In particular, the disk printer transport system of this invention is designed for use with (1) the autoload disk copier system described in this application; and (2) any disk copier system having a disk access aperture large enough to accommodate the temporary insertion of an autoretrieve mechanism that removes a disk from an open disk tray.

As previously described above, typical disk copier systems have multiple disk drive units vertically stacked, and additionally may have multiple stacks orientated at right angles, thus allowing any disk drive to extend its tray into a central square-shaped vertical region formed by the placement of the stacked disk drive units. This square-shaped vertical region is often known as the "disk bay". In current commercially available disk copier systems, one side of the disk bay is delimited by a side face or rear face of the copier system. In the preferred embodiment of the disk printer transport system, a disk access aperture is cut in the face of the existing copier system that adjoins the disk bay, and the disk printer transport system is affixed to the disk access aperture, thereby allowing a retractable platform to enter the disk bay and be positioned directly below the autoretrieve mechanism that has engaged a disk. The autoretrieve mechanism places the disk onto the retractable platform, and the platform is retracted from the existing copier system and into the body of the disk printer transport system.

Once the retractable platform is retracted into the body of the disk printer transport system, the disk held on the retractable platform is retrieved by a second autoretrieve mechanism. The disk tray of a disk printer is extended, and the autoretrieve mechanism places the disk in the disk printer tray, and imprinting upon the top face of the compact disk is commenced.

In an alternate embodiment of the disk printer transport system, a single autoretrieve mechanism, similar to that used in the autoload disk copier system, is affixed to a motor driven belt, and is seated upon two horizontal parallel rail members. After a disk copy operation, the autoretrieve mechanism engages the disk from the disk drive and travels through the disk access aperture of the existing copier system and into the body of the disk printer transport system, and deposits the disk onto the extended disk tray of a disk printer. Although a disk printer is incorporated into the operation of the disk printer transport system as described below, it is to be understood that a different disk device, such as a jukebox disk system, may be configured to receive disks from the autoretrieve mechanism.

The configuration of the personal computer or controller board that is incorporated within the housing of the disk transport system varies from the personal computer or controller used in the autoload copier system because the personal computer or controller board that is incorporated within disk transport system must send disk load, unload, and copy commands to the existing copier system as well as the disk printer. It is expected that this communications configuration will allow users to physically and electronically connect the disk transport system to any existing disk copier system without the need to reprogram or remove the electronic control apparatus resident in the existing disk copier system, thus allowing for a simple 'plug and play' operation. These and other features will be described in greater detail in the detailed description of the preferred embodiments.

DETAILED DESCRIPTION OF THE PREFERRED EMBODIMENTS

Figure 1:
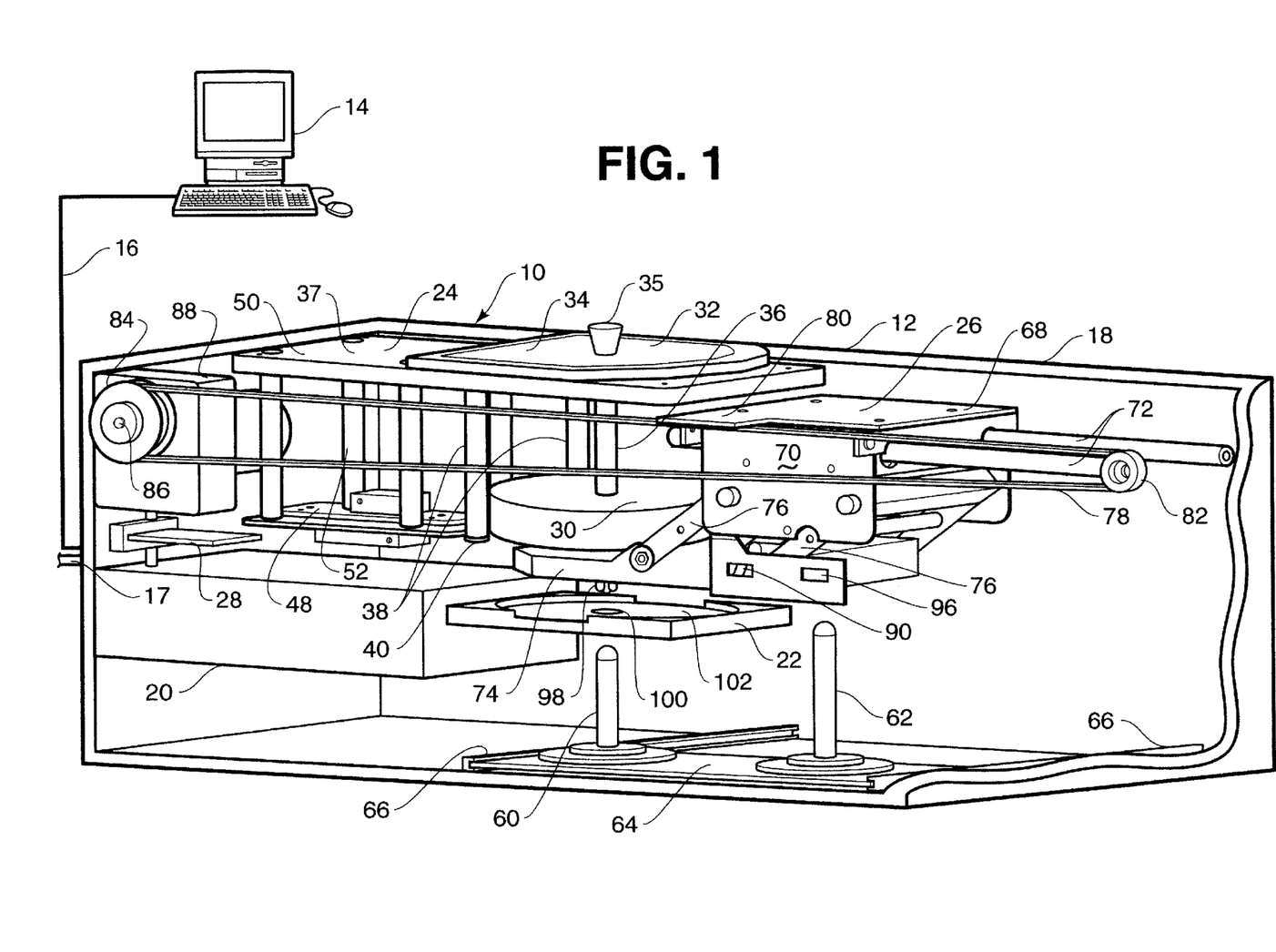
FIG. 1 is a perspective view of the autoload copier unit in an autoload disk copier system having a host computer.

Referring to FIG. 1, the autoload disk copier system of this invention is designated generally by the reference numeral 10. The disk copier system 10 includes an auto load copier unit 12 and a personal computer 14 that is shown schematically in FIG. 1. The personal computer is connected to the autoload copier unit 12 by a cable 16. The copier unit is powered by a conventional power cord 17 connected to a suitable power source (not shown). It is to be understood that the functions of the computer 14 can be incorporated into the autoload copier unit 12 by use of an appropriate computer mother board or other controller. The autoload copier unit 12 has a sheet steel housing 18 shown in FIG. 1 with back panel and top cover frame removed for viewing the internal components.

The copier unit 12 includes a conventional disk drive 20 that is supported by the housing 18 and positioned to present an extended disk tray 22 to an autoload separator mechanism 24 and an auto-retrieve mechanism 26. Mechanical action of the separator and retrieve mechanisms 24 and 26 are controlled by a controller card 28 commanded by a software program in the computer 14. The computer 14 also coordinates the functions of the disk drive 20 with the mechanical operations of the copier unit 14.

The autoload disk copier system 10 is designed to be batch loaded with a stack of recordable disks 30. The disks 30 are supported on a carrier 32 that allows a stack of disks to be loaded into the copier unit 12 through the top of the unit. When data has been recorded on the disks by the drive 20, the disks are removed from the disk tray 22 by the autoretrieve mechanism 26 and deposited on one of two spindles 60 or 62 as hereinafter described.

The autoload disk copier system 10 is designed to record data on blank recordable disks in a manner that does not require supervision during the batch recording process. Using a conventional disk read/write drive 20, which has an extendable loading and unloading tray 22, the autoload copier unit 12 provides the necessary mechanical systems and electronic controls to automatically load, record, and unload disks from the conventional drive 20. It is to be understood that with appropriate variations in the housing configuration and in the control system, additional drives may be incorporated and arranged to selectively position a tray appropriately for the automatic loading process to be performed. As shown in FIG. 1, the drive 20 positions a tray 22 directly below the axis of the stacked disks 30. Additional drives could be positioned at right angles to, and in the same plane as the existing drive, so their trays extend under the stacked disks. Additional drives can also be stacked vertically by increasing the height between the spindle top and bottom drive by required clearance. When using additional drives, disks may be transferred from one drive to another (or from drive to printer) using the autoretrieve mechanism. The autoretrieve mechanism picks the disk from the source drive tray and then places the disk into the target drive or printer tray. The use of the autoretrieve mechanism for disk transfer minimizes the distance the disk dropped. This transfer method ensures disks are placed in the tray in a controlled manner and do not bounce out of the tray.

Figure 2:
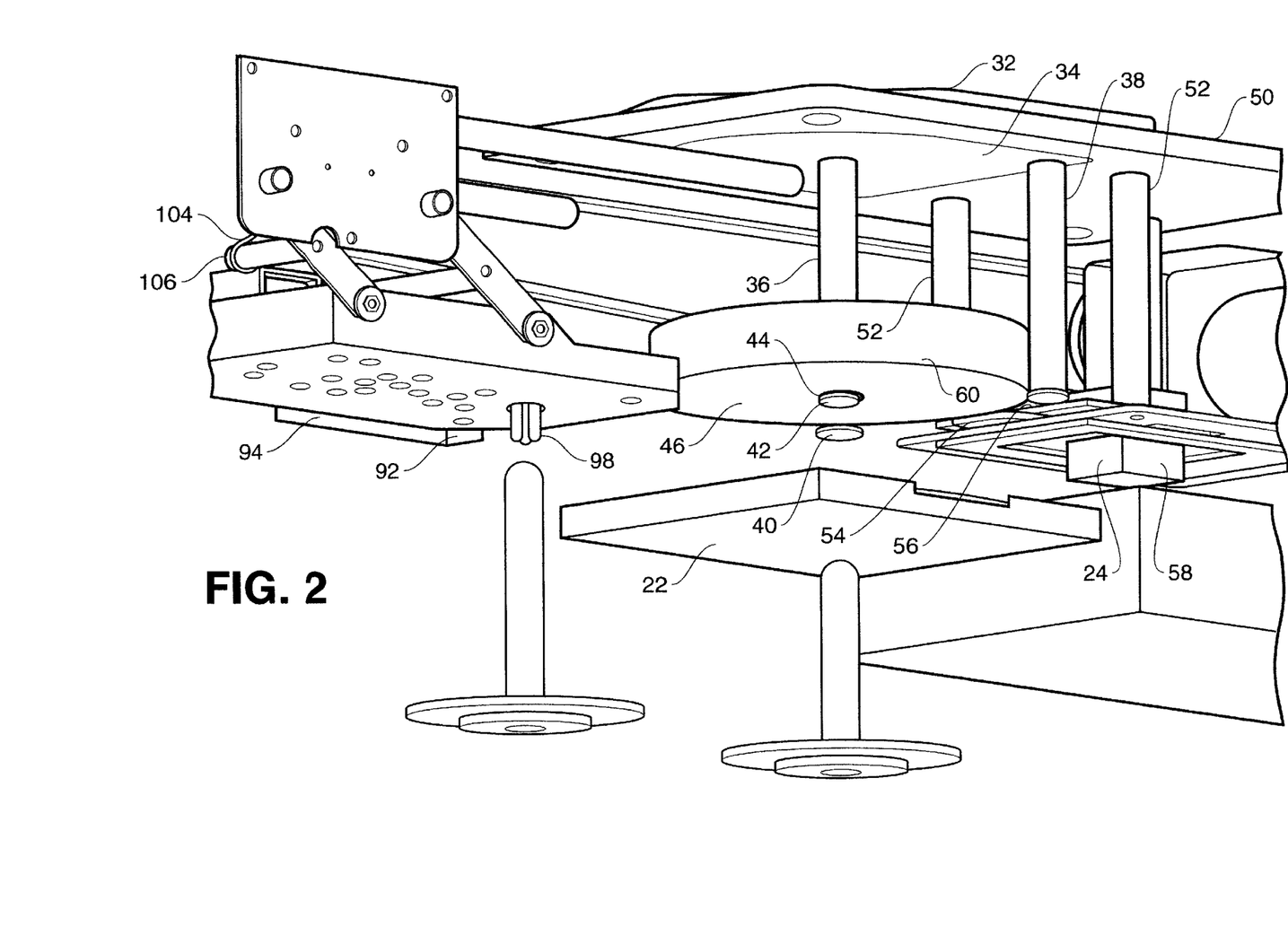
FIG. 2 is a partial perspective view of the autoload copier unit of FIG. 1.

The carrier 32 has a top cover 34 with a central knob 35 permitting the carrier and any disks to be installed or removed from a top support deck 37 on the copier unit 12. The carrier 32 has a central post 36 on which the disks are stacked, and a pair of displaced end posts 38 with a foot 40. As shown in the enlarged schematic view of the underside of the carrier 32, the center post has an eccentric foot 42 that has a lip 44 that engages the underside of the lower most disk 46. This lip 44 together with the projecting foot 40 on each of the two end posts 38 supports the stack of disks 30 on the center post 36 until the lower-most disk 46 is horizontally displaced by the autoload separator mechanism 24, the autoload separator mechanism 24 operates cooperatively with the carrier 32 to horizontally displace the lower-most disk 46 from the center post 36 dropping the disk down to the extended tray 22, as shown in FIG. 2. Although the lip 44 may be uniform in thickness, slight tapering of the lip 44 on the side facing the spindles 60 and 62 allow for a large increase in the number of disks that can be loaded onto the center post 36, thus greatly enlarging the copying capacity of the autoload disk copier system 10.

It is to be noted that during this operation, the auto retrieve mechanism 26 is retracted to clear the path from the supporting disk carrier 32 to the extended tray 22. When the disk has been successfully deposited into the tray 22, the tray retracts into the recording drive 20 and the disk is recorded with data delivered by the computer 14 or an electronic controller with access to a hard disk, CD reader drive, computer network or internet. It is to be understood that the disk drive 20 may have a read feature, as well as a write feature for extracting data from a master disk during a read operation. In this manner, the data is transferred to the internal hard drive of the computer 14 or controller where it is stored for use in writing the blank disks stacked in the carrier 32.

The autoload separator mechanism 24 has a platform 48 suspended from the mounting plate 50 by posts 52. The platform 48 has a projecting lip 54, as shown in FIG. 2. The lip 54 contacts the underside of the lower-most disk 46. This insures that the lower-most disk 46 is in position for contact by a thin displaceable pusher 56 on top of the lip 54 that is actuated by a solenoid 58. When activated, the solenoid 58 displaces the pusher 56 which contacts the edge 60 of the lower-most disk 46 providing sufficient displacement to drop the disk 46 from the support post 36 and onto the extended tray 22. After data has been recorded on the disk 46 it is then deposited on one of two spindles, 60 or 62. Defective disks are deposited on spindle 60 and acceptable disks are deposited on spindle 62. The spindles 60 and 62 are mounted on a tray 64 that is slidable in a track 66 for convenient removal from the copier unit 12.

After copying, automatic retrieval of the recorded disk from the disk tray 22 is accomplished by the autoretrieve mechanism 26. This mechanism includes a reciprocal shuttle 68 with a displaceable carriage 70 mounted on parallel guide rods 72. The carriage 70 supports a pick-up head 74 on two pair of parallel links 76.

The shuttle 68 is transported by a pulley belt 78 that is connected to a tab 80 on the carriage 70 and wrapped about an idler pulley 82 mounted to the back of the housing (not shown) and a drive pulley 84 that is mounted on a shaft 86 connected to an electric stepping motor 88 that is operated by the controller card 28 under command of the computer 14. In this manner the shuttle 68 can be moved from a first position over the storage spindle 62 as shown in FIG. 2, or a second position over the disk tray 22 as shown in FIG. 1. As the pick-up head 74 reaches the position shown in FIG. 1, a cam roller 90 contacts the vertical deflector 92 of an angled side plate 94 that is fixed to the housing 18 by fasteners (not shown) through side slots 96. Once the roller 90 (partially visible in FIG. 1) contacts the deflector 92 the pick-up head 74 is downwardly displaced to enable pick-up prongs 98 to enter the center hole 100 of a disk 102 in the disk tray 22.

Figure 3:
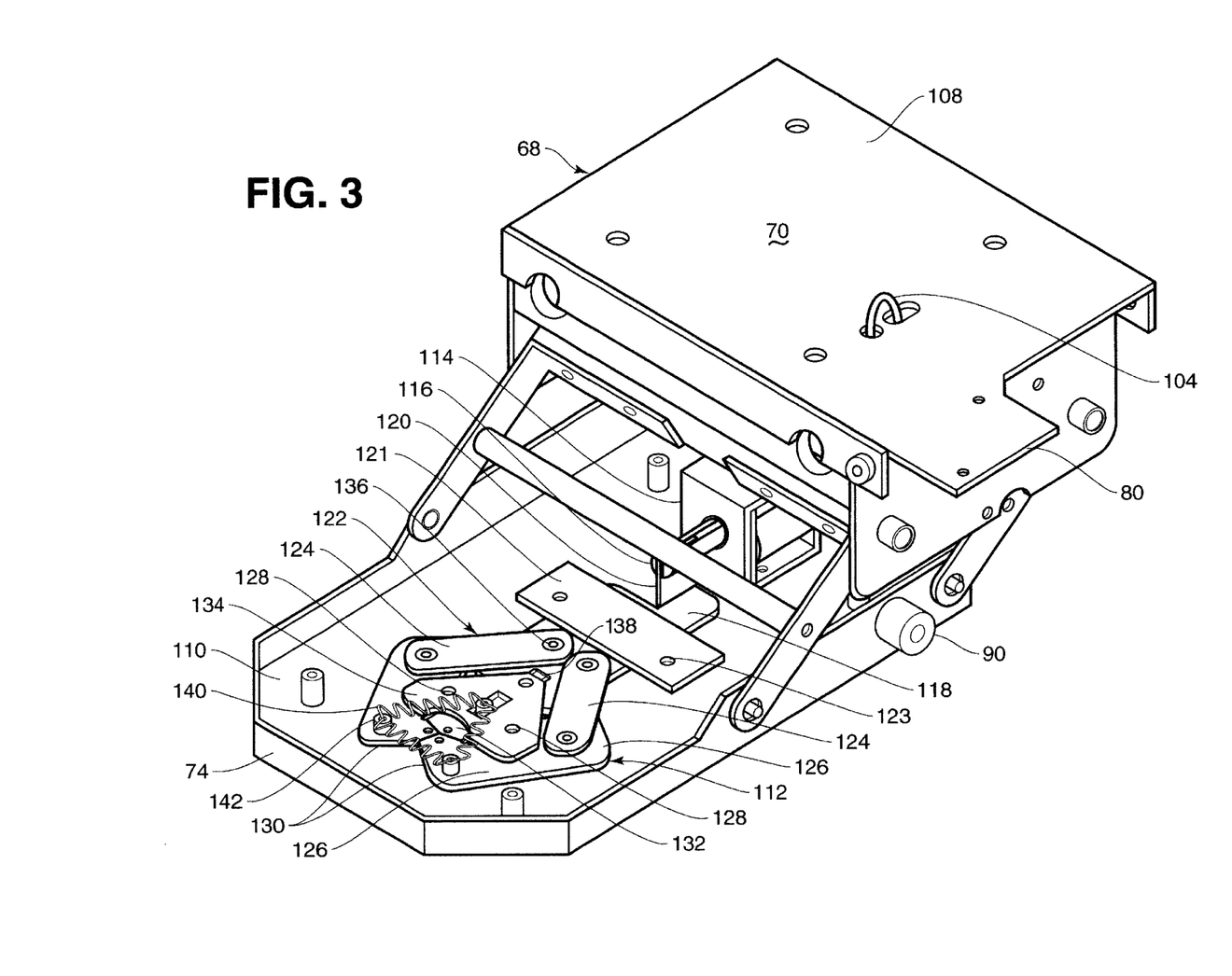
FIG. 3 in an enlarged perspective view of an autoretrieve component in the autoload copier unit of FIG. 1.

The cam roller 90 is shown in the enlarged perspective view of the shuttle 68 shown in FIG. 3. To bias the pick-up head 74 in the raised position, a tension spring 104 is connected between a cross-rod 106 for a pair of the links 96 and a top plate 108 of the carriage 70.

Referring to the detailed view of the shuttle 68 in FIG. 3, the pick-up head 74 has a cantilevered, low-profile arm 110 that contains an actuating mechanism 112 for the three pick-up prongs 98. The actuating mechanism 112 uniformly splays the prongs 98 so that they uniformly engage the disk 102 via the center hole. The actuating mechanism 112 includes an electronically controlled solenoid 114 with a displaceable core 116 connected to a tongue 118 by a turned-up tab 120. The sliding tongue 118 lies flat on the low-profile arm 110 held down by a cross bar 121 with raised fasteners 123. The tongue 118 is connected to a linkage assembly 122. The linkage assembly 122 includes a pair of connecting links 124 that are each connected at one end to the slidable tongue 118, and at the opposite end to a pivotal rocker arm 126. The rocker arms 126 pivot about pins 128, such that when the tongue 118 is retracted the ends of the rocker arms 130, to which two of the prongs 98 are attached, pivot apart. The third prong is attached to an extension 132 of the tongue that slides under a retainer plate 134 that is supported by the two pivot pins 128 and a support pin 136. A slot 138 in the tongue 118 enables the tongue to slide with respect to the pin 136 to displace the extension 132 together with the rocker arms 126. Springs 140 interconnecting bosses 142 on the rocker arms 126 and tongue extension 132 bias the prongs 98 to a contracted position when the solenoid 114 is not activated.

In operation, the autoload disk copier system customarily follows the following protocol. The carrier 32 is removed from the copier unit 12 and the center post 36 is unthreaded from the cover 34. Carrier is partially inverted and a stack of disks is seated against the underside of the cover 34 against the end posts 38 which function as alignment posts. The center post 36 is reinstalled and the foot 42 is oriented such that the lip 44 is directed away from the two alignment posts 38 which are at one side of the stack of disks. The carrier with the stack of disks is loaded into the autoload copier unit 12. The host computer issues a command to open the disk tray 22 of the drive 20. The disks separator solenoid 58 is activated so that the pusher 56 contacts the lower-most disk 46, dropping the disk to the open disk tray 22. The host computer 14 issues a command to close the drive tray and the drive either reads or writes data to the disk. When the drive has completed its function, the host computer issues a command to open the disk tray 22. Then, the host computer 14 issues a command to move the autoretrieve mechanism 26 to a position that the retrieving arm 110 is centered over the tray with the prongs 98 inserted into the hole of the disk. The computer 14 issues the command to activate the solenoid 114 to splay the prongs 98 and grasp the disk seated in the disk tray 22. The shuttle 68 is then moved to raise the pick-up head 74 allowing the command to close the disk tray to be issued. After the disk tray is closed the pick-up head is moved into position over either the spindle for good disks or the spindle for bad disks, according to results from a disk test operation performed by the computer 14. A command is then issued to release the disk and the disk drops to the appropriate spindle. The system is then ready to load the next blank disk into the drive and the process continues until no more disks remain in the carrier 32.

It is to be understood that the components forming the autoload copier unit have alternate or equivalent configurations. For example, referring to the schematic views of FIGS. 4–9, alternate means for supporting the disks in the carrier and removing a disk from the drive tray are shown.

Figure 4:
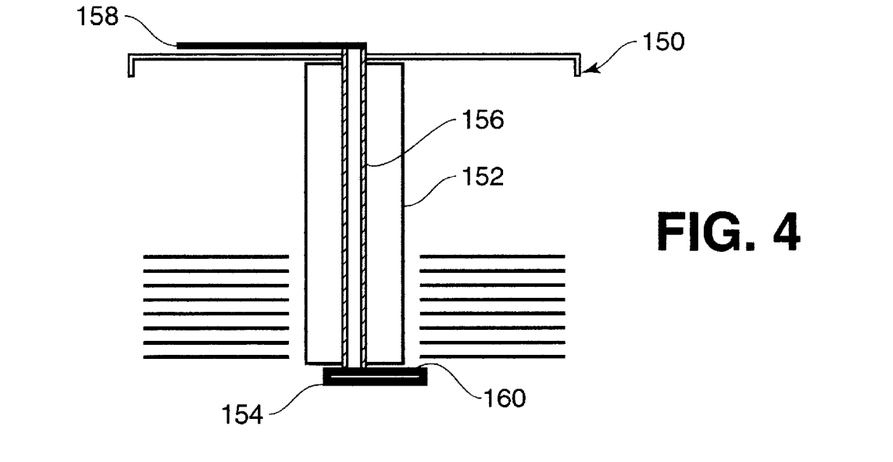
FIG. 4 is a schematic view of an alternate autoload component.

In FIG. 4, a carrier 150 is shown with a center post 152 having a foot 154 connected to a pin 156 that is eccentrically positioned in the post 152. By turning a top lever 158 the foot 152 can be pivoted to a position in which the lip 160 does not project from the post 152, allowing easy loading of the carrier.

Figure 5:
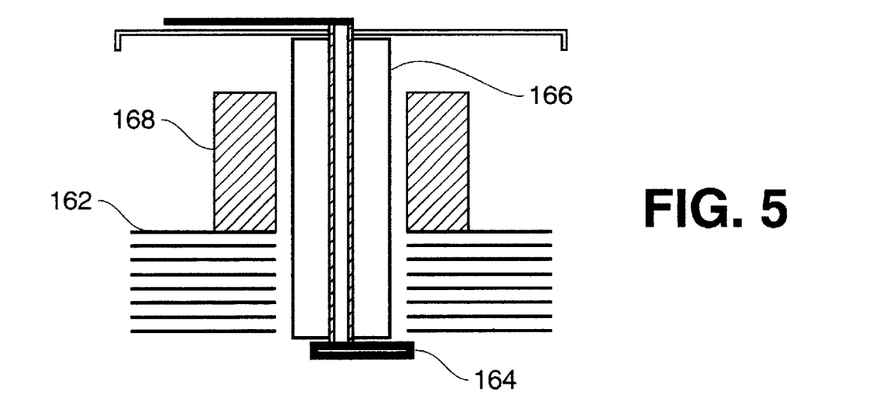
FIG. 5 is a schematic view of an additional alternate autoload component.

In FIG. 5, to maintain the disk stack 162 on the foot 164 of a post 166, an annular weight 168 is positioned on top of the stack 162.

Figure 6:
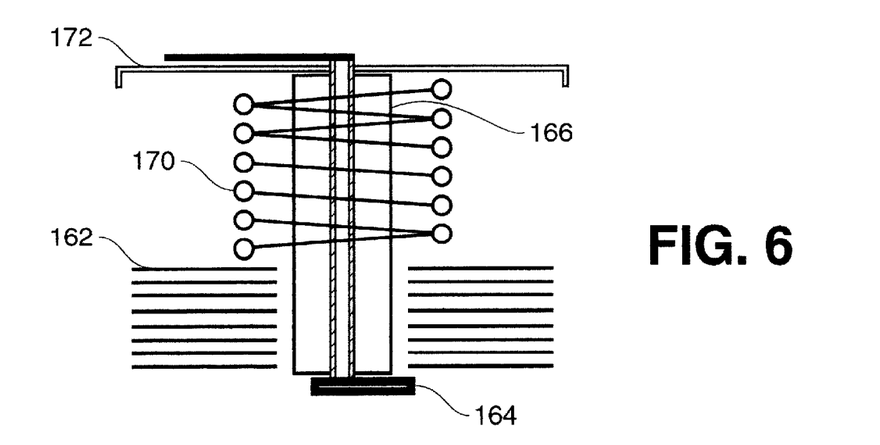
FIG. 6 is a schematic view of an additional alternate autoload component.

Alternately, pressure can be maintained on the stack against the foot by a spring 170 that contacts the cover 172 and the disk stack 162.

Figure 7:
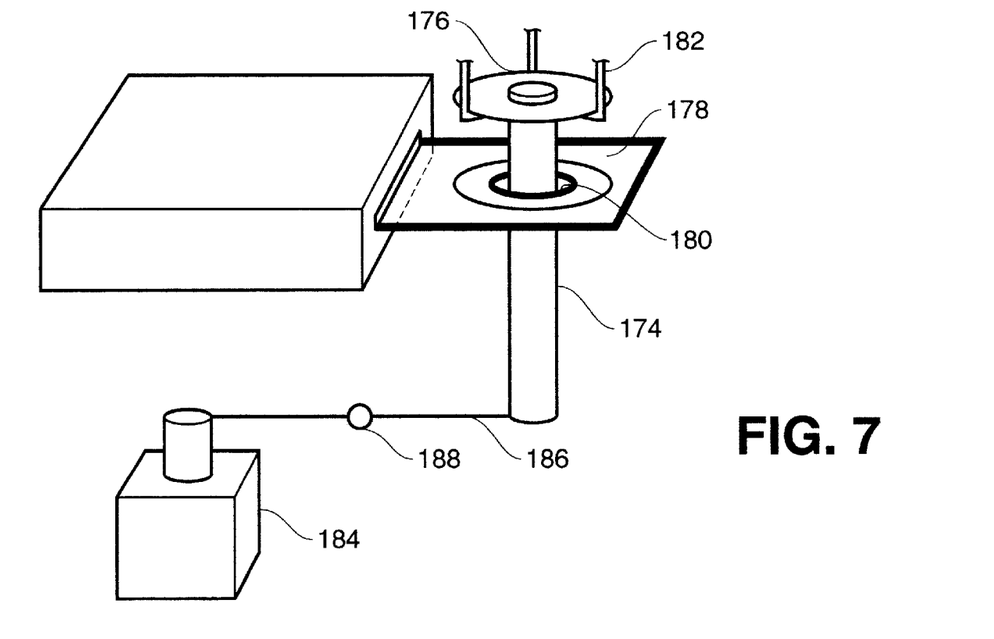
FIG. 7 is a schematic view of an alternate autoretrieve component.

In addition, an alternate pick-up mechanism may be utilized that comprises a post 174 with small projections (not visible) proximate the end of the post that enabled the post to lift a disk 176 from a drive tray 178 through the center hole 180 of the tray 178. In this manner, an alternate mechanism such as the perimeter pick-up hooks 182 can retain the disk 176 when the post 174 is retracted by action of a solenoid 184 acting through a lever 186 pivoting about a pivot point 188.

Figure 8:
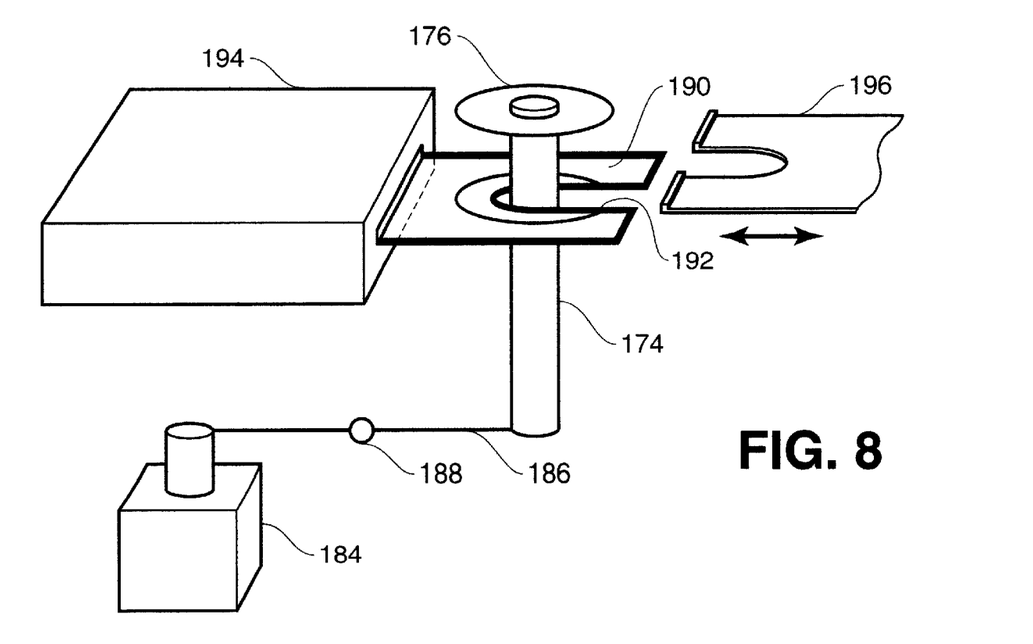
FIG. 8 is a schematic view of an additional autoretrieve component.

Additionally, as shown in FIG. 8, a modification to a drive tray 190 by incorporation of a slot 192 enables the pick up posts 174 to lift a disk 176 and hold it in an elevated position while the tray retracts into the drive 194. An alternate transport mechanism similar to the drive tray 196 can be extended under the elevated disks 176 and the post 174 lowered when the disk 176 is supported by the alternate conveyer 196.

Figure 9:
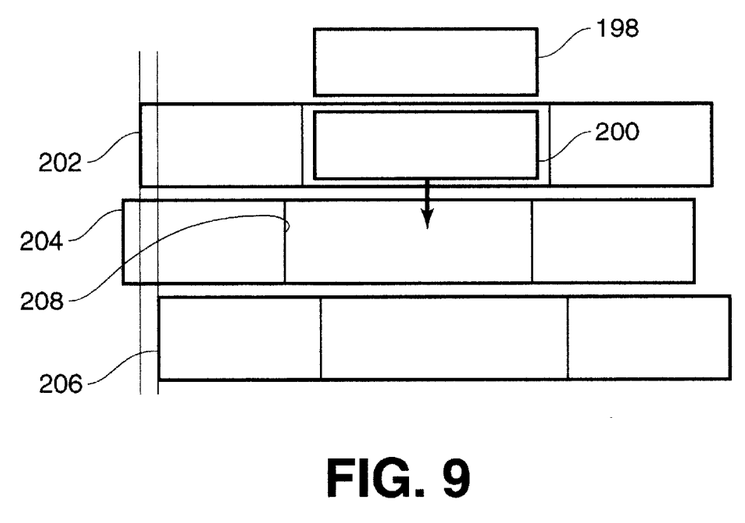
FIG. 9 is a schematic view of a further alternate autoload component.

In FIG. 9, there is shown an alternate means for separating disks from a disk stack. In this embodiment, a stack of disks 198 are arranged over plates 200 each having a central receiving area 202 slightly larger than the diameter of the disk. The circular receiving areas are not aligned and a disk is prevented from dropping beyond the upper most plate 202 by the eccentrically positioned middle plate 204. When the middle plate 204 is displaced for axial alignment with the upper plate 202, the disk drops into the middle plate and is retained in this position until the middle plate is further displaced aligning the middle plate with the lower most plate 206 allowing the connected disk to drop to a receiver such as an open disk tray.

Figure 10:
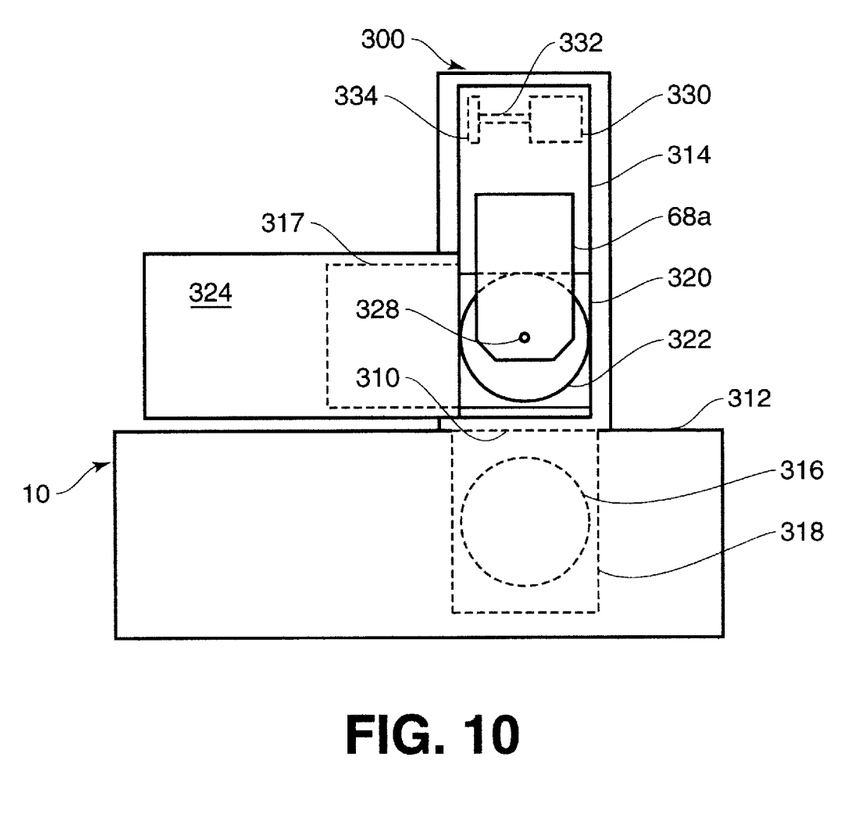
FIG. 10 is a schematic top view of the disk printer transport system connected to the autoload disk copier system described in FIG. 1 through FIG. 3.

Referring to FIG. 10, the disk printer transport system of this invention is designated generally by the reference numeral 300. FIG. 10 is a schematic top view of the disk printer transport system 300 connected to an autoload copier system 10. The disk printer transport system 300 connects to the autoload copier system 10 along a disk access aperture 310 that has been made into the rear face 312 of the autoload copier system 10. Alternatively, the entire rear face 312 of the autoload copier system 10 could be removed and replaced with an enclosure that is affixed to the disk printer transport system 300 and contains a prefabricated disk access aperture 310. The size and placement of the disk access aperture 310 is chosen such that a retractable platform 314 may extend inside the autoload copier system 10 and accept a disk 316 located in the copier disk bay 318.

In FIG. 10, the retractable platform 314 is displayed in its fully retracted position. A disk printer tray 320 holds a disk 322 that is ready for insertion into a disk printer bay 317 of a disk printer 324. A shuttle 68a substantially similar to the shuttle 68 previously described and illustrated in FIG. 3 is positioned above the disk 322 and pivots downward to engage disk 322 using the three prongs 328.

Figure 11:
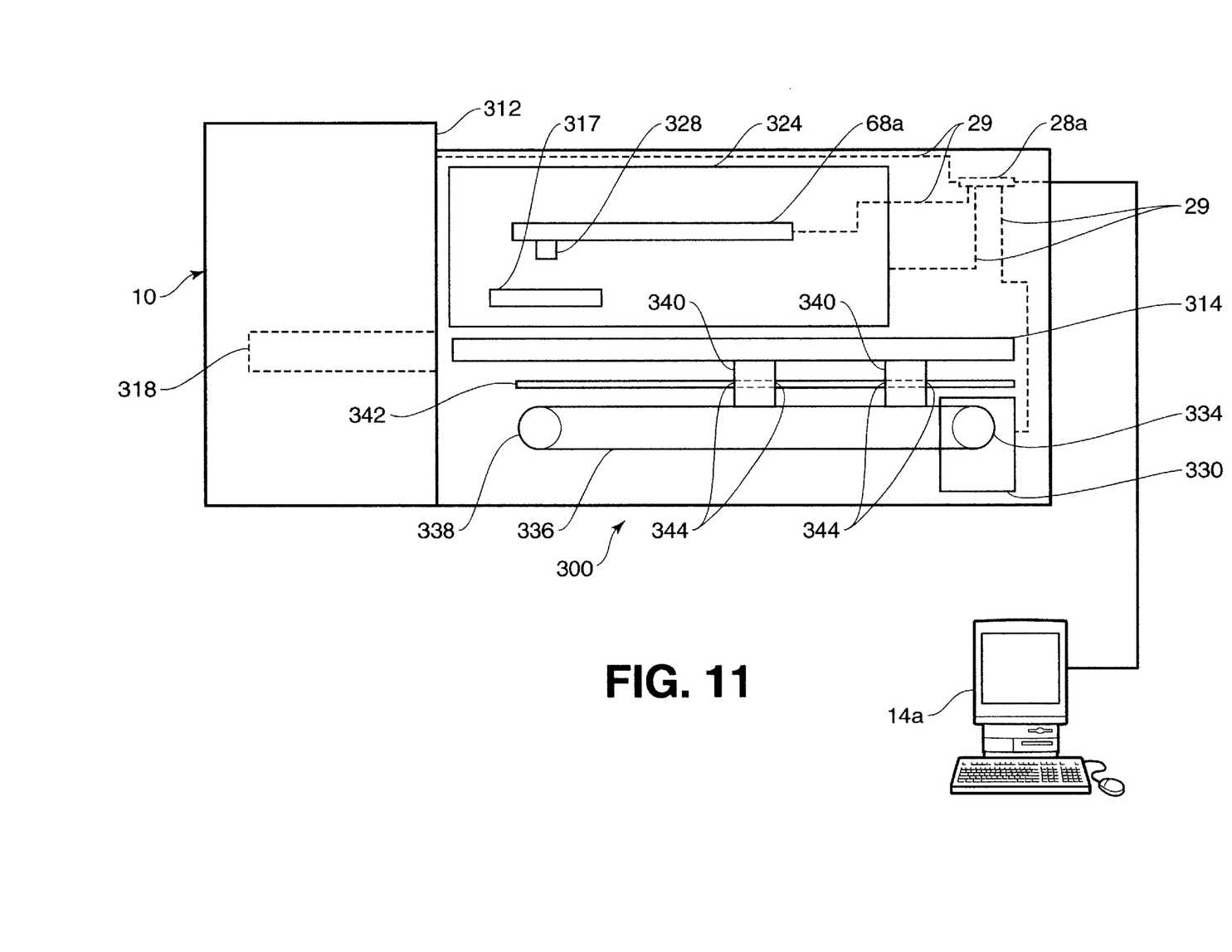
FIG. 11 is a schematic side view of the disk printer transport system connected to the autoload disk copier system described in FIG. 1 through FIG. 3.

FIG. 11 displays a side schematic view of the disk printer transport system 300 connected to the autoload copier system 10. Referring to FIGS. 10 and 11, below the retractable platform 314 is a motor 330 having an axle 332 that rotates a belt roller member 334. A belt 336 rotates about the belt roller member 334 horizontally and terminates about a second belt roller member 338. The bottom faces of two belt guide members 340 are affixed to the top of the belt 336 and are displaced horizontally when the motor 330 rotates the axle 332.

The top faces of the two belt guide members 340 are affixed to the bottom face of the retractable platform 314 and transfer the horizontal motion of the belt 336 to the retractable platform 314. A support bar 342 is placed horizontally below the retractable platform 314 and above the top of the belt 336. The support bar 342 travels through horizontal apertures 344 bored through each belt guide member 340 and reduce the amount of tension in the belt 336 created by the weight of the retractable platform 314.

Similar to the arrangement in the autoload disk copier system 10, mechanical action of the retractable platform 314, the shuttle 68a, the placement of a disk 316 in the copier disk bay 318, and the placement of a disk in the disk printer bay 317 are controlled by a controller card 28a commanded by a software program in a host computer 14a. Electrical commands are sent through electrical connection members 29.

Figure 12:
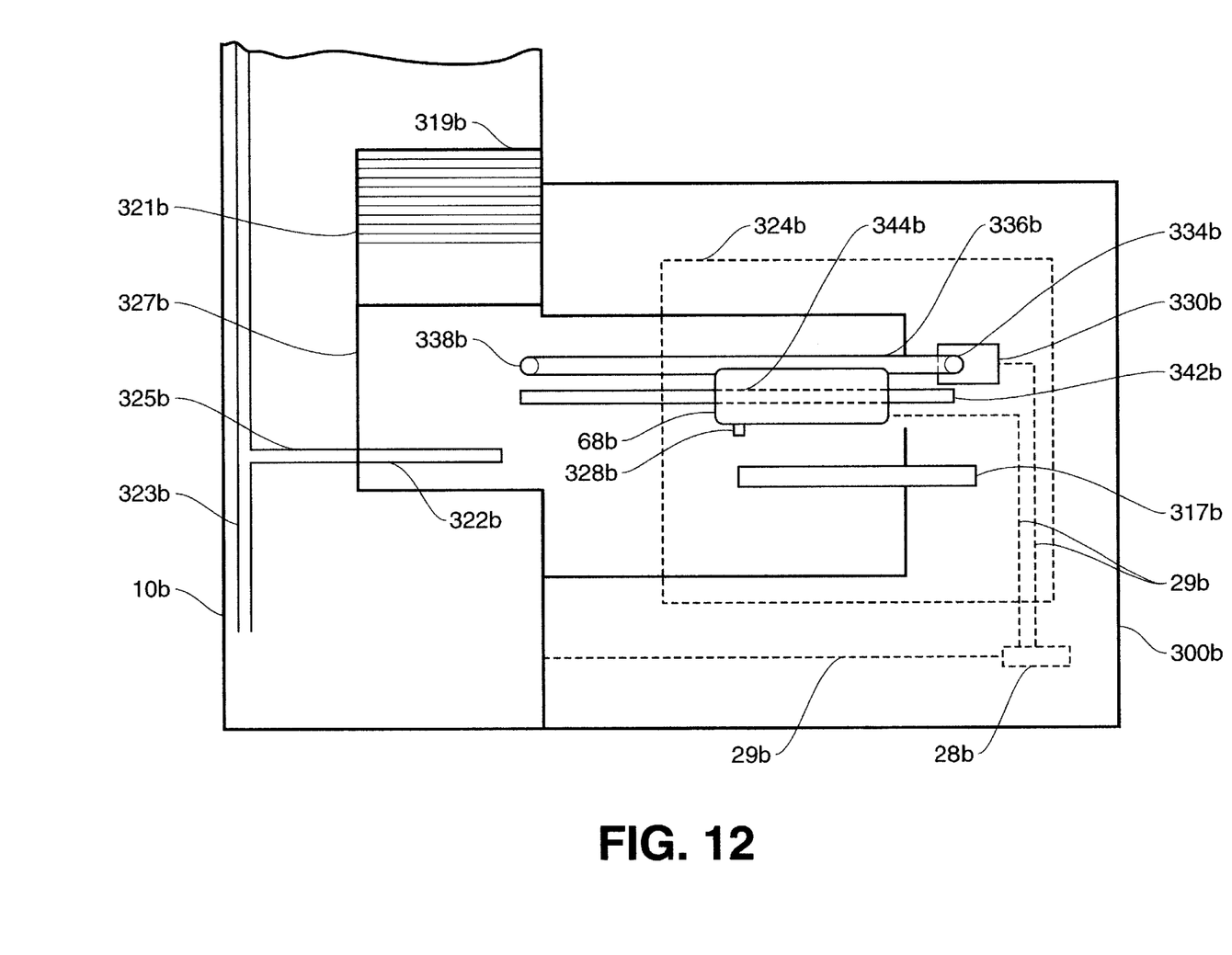
FIG. 12 displays a schematic side view of an alternate embodiment of the disk printer transport system having a single autoretrieve mechanism that engages a disk from a jukebox copier and transports the disk to a disk printer.

FIG. 12 displays a schematic side view of an alternate embodiment of the disk printer transport system 300b. This embodiment is particularly directed at a class of disk copier systems collectively known as "jukebox" copiers. Referring to FIG. 12, the disk printer transport system 300b is connected to a jukebox copier system lob. The jukebox copier system 10b has a set of disk bay members that can accommodate a disk pack member 319b, each disk pack member 319b holding a horizontal stack of disk members 321b. An elevator mechanism 323b raises and lowers a retractable disk tray 325b that inserts or removes any disk member 321b from any disk pack member 319b.

In order to properly operate the disk printer transport system 300b, a user must first remove a disk pack member from a disk bay member to allow the disk printer transport mechanism to partially enter the resulting empty disk bay member. In FIG. 12, the corresponding empty disk bay member is designated by the identifier 327b.

The successful mating of the disk printer transport system 300b to the jukebox copier system 10b allows a shuttle 68b to travel horizontally inside the empty disk bay member 327b and engage a disk 322b positioned on the retractable disk tray 325b. Three prong members 328b engage the disk 322b through the attachment process previously described.

Horizontal movement of shuttle 68b is accomplished by a motor 330b having an axle 332b (not shown) that rotates a belt roller member 334b. A belt 336b rotates about the belt roller member 334b horizontally and terminates about a second belt roller member 338b. The top face of the shuttle 68b is affixed to the bottom of the belt 336b and is displaced horizontally when the motor 330b rotates the axle 332b.

A support bar 342b is placed horizontally below the belt 336b and the support bar 342b travels through a horizontal aperture 344b bored through the housing of the shuttle 68b and reduces the amount of tension in the belt 336b created by the weight of the shuttle 68b.

Once the disk 322b is engaged by the shuttle 68b, the shuttle 68b raises vertically an amount sufficient to clear the retractable disk tray 325b, and then travels horizontally towards a disk printer bay 317b. Upon receipt of the proper command sent by a controller card 28b, a disk printer tray 320b (not shown) emerges from the disk printer bay 317b, and the shuttle 68b places the disk 322b onto the disk printer tray 320b for printing by a disk printer 324b.

Similar to the arrangement in the autoload disk copier system 10, mechanical action of the shuttle 68b, the placement of a disk 316b onto the retractable disk tray 325b, and the placement of a disk in the disk printer bay 317b are controlled by the controller card 28b commanded by a software program in a host computer 14b (not shown). Electrical commands are sent through electrical connection members 29b.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An autoload disk copier system comprising:
   a copier unit having:
   a housing;
   a disk drive mounted in the housing, the drive unit having a disk tray with a first extended position for receiving or removing a compact disk in the tray and a second retracted position for reading or writing a disk in the tray by the disk drive;
   a disk load means supporting a plurality of disks in a stack over the disk tray;
   autoload separator means for displacing a disk from the stack in the disk load means to the disk tray when the disk tray is in the extended position;
   autoretrieve means separate from the autoload separator means for displacing a disk in the disk tray when the disk tray is in the extended position, wherein the autoretrieve means comprises a reciprocal shuttle mechanism having a shuttle with a displaceable carriage and a pickup head mechanically supported by the carriage, the pickup head having an engagement mechanism that engages a disk and retains the disk on the pickup head;
   disk storage means separate from the disk load means for storing disks displaced from the disk tray by the autoretrieve means; and
   electronic control means electronically connected to the disk drive, the autoload separator means and the autoretrieve means for controlling the sequence of operations including extending the disk tray, retracting the disk tray into the drive, activating the disk drive, and retrieving a disk from the tray, wherein the disk load means comprises a carrier with a central support post having a depending end with a foot, wherein compact disks have a center hole and are installable in a stack on the central support post which passes through the center hole of the stacked disks, that stacked disks having a lower-most disk seated on the foot.

2. The autoload disk copier system of claim 1 wherein the copier system includes a programmed computer electronically connected to the electronic control means of the copier unit, wherein the electronic control means comprises a controller.

3. The autoload disk copier system of claim 1 wherein the control means of the copier unit comprises a programmable computer and a controller electronically connected to the programmable computer.

4. The autoload disk copier system of claim 1 wherein the autoload means includes an electronic actuator means for displacing the lower-most disk from the foot.

5. The autoload disk copier system of claim 4 wherein the autoload means has a pusher member arranged proximate the lower-most disk when a stack of disks are installed on the central support post, the pusher member being connected to an electronic actuator, the actuator displacing the pusher member against the lower-most disk when the actuator is activated, the lower-most disk being displaced from the foot of the central support post.

6. The autoload disk copier system of claim 5 wherein the carrier has two end posts each having a projecting foot the end posts, being positioned at one side of the stack of disks when a stack of disks is installed on the centerpost, the lower-most disk being supported in part on the foot of each end posts.

7. The autoload disk copier system of claim 1 having bias means for biasing a stack of disks against the support foot.

8. An autoload disk copier system comprising:
   a copier unit having;
   a housing;
   a disk drive mounted in the housing, the drive unit having a disk tray with a first extended position for receiving or removing a compact disk in the tray and a second retracted position for reading or writing a disk in the tray by the disk drive;
   a disk load means supporting a plurality of disks in a stack over the disk tray;
   autoload separator means for displacing a disk from the stack in the disk load means to the disk tray when the disk tray is in the extended position;

autoretrieve means separate from the disk load means for displacing a disk in the disk tray when the disk tray is in the extended position;

disk storage means for storing disks displaced from the disk tray by the autoretrieve means, and electronic control means electronically connected to the disk drive, the autoload separator means and the autoretrieve means for controlling the sequence of operations including extending the disk tray, retracting the disk tray into the drive, activating the disk drive, and retrieving a disk from the tray, wherein the autoretrieve means comprises a reciprocal shuttle mechanism having a shuttle with a displaceable carriage and a downwardly displaceable pickup head mechanically connected to the carriage, the pickup head having engagement means for engaging a disk and retaining the disk on the pickup head.

9. The autoload disk copier system of claim 8 wherein the pickup head is mechanically connected to the carriage with two pair of parallel links.

10. The autoload disk copier system of claim 9 wherein the displacement of the pickup head is actuated by a cam mechanism.

11. An autoload disk copier system comprising;

a copier unit having;

a housing;

a disk drive mounted in the housing, the drive unit having a disk tray with a first extended position for receiving or removing a compact disk in the tray and a second retracted position for reading or writing a disk in the tray by the disk drive;

a disk load means supporting a plurality of disks in a stack over the disk tray;

autoload separator means for displacing a disk from the stack in the disk load means to the disk tray when the disk tray is in the extended position;

autoretrieve means separate from the disk load means for displacing a disk in the disk tray when the disk tray is in the extended position;

disk storage means for storing disks displaced from the disk tray by the autoretrieve means; and electronic control means electronically connected to the disk drive, the autoload separator means and the autoretrieve means for controlling the sequence of operations including extending the disk tray, retracting the disk tray into the drive, activating the disk drive, and retrieving a disk from the tray, wherein the autoretrieve means comprises a horizontally reciprocal shuttle mechanism having a shuttle with a displaceable carriage and a downwardly displaceable pickup head mechanically connected to the carriage, the pickup head having disk engagement means for releasably engaging a disk at a center portion of the disk and retaining the disk on the pickup head for transport by the shuttle.

12. The autoload disk copier system of claim 11 wherein the shuttle mechanism has displacement means for displacing the shuttle between a first position with the pickup head positioned over the disk tray when extended, and a second position with the pickup head displaced from the disk tray when extended.

13. The autoload disk copier system of claim 12 wherein the displacement means includes horizontal displacement means for horizontally displacing the shuttle between the first position and the second position and vertical displacement means for vertically displacing the pickup head when the pickup head is positioned over the disk tray when extended.

14. The autoload disk copier system of claim 13 wherein the pickup head includes a plurality of pickup prongs and the disks have a central hole wherein the pickup prongs have means for engaging and retaining a disk at the central hole of the disk.

15. The autoload disk copier system of claim 14 wherein the pickup head has link means to splay the pickup prongs.

16. The autoload disk copier system of claim 14 wherein the copier unit has at least one disk storage spindle and wherein the pickup head has control means for depositing a disk engaged by the prongs onto the disk storage spindle.

17. The autoload disk copier system of claim 4 wherein the autoretrieve means comprises a lift post under the extended tray with means for engaging and lifting a disk from the tray.

18. The autoload disk copier system of claim 17 wherein the disk tray has a slot to accommodate the liftpost.

19. The autoload disk copier system of claim 11 wherein the pickup head is mechanically connected to the carriage with two pair of parallel links.

20. The autoload disk copier system of claim 19 wherein the displacement of the pickup head is actuated by a cam mechanism.

21. A disk printer transport system for attachment to a disk copier system, the disk printer transport system comprising:

a transport unit having:

a housing;

a disk printer having a disk printer tray having an extended position for receiving a compact disk for printing and a retracted position for printing on a compact disk received in the disk printer tray, the disk printer being located inside the housing;

displaceable transport means for receiving and holding a disk from the disk copier system and transporting the disk to the transport unit;

autoretrieve means for displacing a disk held by the transport means, placing the disk onto the disk printer tray when the disk printer tray is in its extended position and retrieving the disk from the printer tray when the disk is printed, wherein the autoretrieve means is a reciprocal shuttle mechanism having a shuttle with a displaceable carriage and a downwardly displaceable pickup head mechanically connected to the carriage, the pickup head including a plurality of pickup prongs and the disks having a central hole wherein the pickup prongs have means for engaging and retaining a disk at the central hole of the disk, wherein the pickup head has link means to splay the pickup prongs; and, electronic control means electronically connected to the disk copier system, the transport means, the autoretrieve means, and the disk printer for controlling the sequence of operations including extending and retracting the disk printer tray, displacing the transport means, displacing a disk from the transport means, placing and retrieving the disk onto and from the disk printer tray, and engaging the disk printer.

22. The disk printer transport system of claim 21 wherein the disk printer transport system includes a programmed computer electronically connected to the electronic control means of the transport unit and the disk copier system, wherein the electronic control means comprises a controller.

23. The disk printer transport system of claim 22 wherein the control means of the transport unit comprises a programmable computer and a controller electronically connected to the programmable computer.

24. The disk printer transport system of claim 21 wherein the shuttle mechanism has displacement means for displacing the shuttle between a first position with the pickup head positioned over the printer disk tray when extended, and a second position with the pickup head displaced from the printer disk tray when extended.

25. The disk printer transport system of claim 24 wherein the displacement means includes horizontal displacement means for horizontally displacing the shuttle between the first position and the second position and vertical displacement means for vertically displacing the pickup head when the pickup head of the shuttle is positioned over the printer disk tray when extended.

26. A disk printer transport system in combination with a disk copier system having a disk copier tray, the combined disk printer transport system and disk copier system comprising:
   a transport unit having:
      a housing;
      a disk printer having a disk printer tray having an extended position for receiving a compact disk for printing and retracted position for printing on a compact disk in the disk printer tray;
      autoretrieve means for retrieving a disk from the disk copier tray when the disk copier tray is in the extended position, holding and transporting the disk to the disk printer and placing the disk onto the disk printer tray when the disk printer tray is in its extended position and, after printing, retrieving the disk from the disk printer tray, wherein the autoretrieve means comprises a reciprocal shuttle mechanism having a shuttle with a displaceable carriage and a downwardly displaceable pickup head mechanically supported by the carriage, the pickup head having an engagement mechanism that engages a disk and retains the disk on the pickup head;
      electronic control means electronically connected to the disk copier system, and autoretrieve means, and the disk printer for controlling the sequence of operations including extending and retracting the disk copier tray, extending and retracting the disk printer tray, retrieving a disk from the disk copier tray, transporting the disk to the disk printer, placing and retrieving the disk onto and from the disk printer tray, and engaging the disk printer.

27. The disk printer transport system of claim 26 wherein the disk printer transport system includes a programmed computer electronically connected to the electronic control means of the transport unit and the disk copier system, wherein the electronic control means comprises a controller.

28. The disk printer transport system of claim 27 wherein the control means of the transport unit comprises a programmable computer and a controller electronically connected to the programmable computer.

29. The disk printer transport system of claim 28 wherein the shuttle mechanism has displacement means for displacing the shuttle between a first position with the pickup head positioned over the disk tray or the disk printer tray when extended, and a second position with the pickup head displaced from the disk tray or the disk printer tray when extended.

30. The disk printer transport system of claim 29 wherein the displacement means includes horizontal displacement means for horizontally displacing the shuttle between the first position and the second position and vertical displacement means for vertically displacing the pickup head when the pickup head is positioned over the disk tray when extended or the disk printer tray when extended.

31. The disk printer transport system of claim 30 wherein the pickup head includes a plurality of pickup prongs and the disks have a central hole wherein the pickup prongs have means for engaging and retaining a disk at the central hole of the disk.

32. The disk printer transport system of claim 31 wherein the pickup head has link means to splay the pickup prongs.

* * * * *